United States Patent [19]

Schulz

[11] Patent Number: 4,844,647

[45] Date of Patent: Jul. 4, 1989

[54] DEVICE FOR CONNECTING THE PARTS OF POTENTIOMETER HOUSINGS

[76] Inventor: Klaus-Dieter Schulz, Ilgenweg 11a, 1000 Berlin 47, Fed. Rep. of Germany

[21] Appl. No.: 116,076

[22] PCT Filed: Jan. 17, 1987

[86] PCT No.: PCT/EP87/00023

§ 371 Date: Sep. 29, 1987

§ 102(e) Date: Sep. 29, 1987

[87] PCT Pub. No.: WO87/04849

PCT Pub. Date: Aug. 13, 1987

[30] Foreign Application Priority Data

Jan. 31, 1986 [DE] Fed. Rep. of Germany ....... 3603370

[51] Int. Cl.$^4$ ............................................. F16B 1/00
[52] U.S. Cl. ..................................... 403/24; 403/341; 403/273; 403/300; 285/381
[58] Field of Search ............... 403/341, 339, 340, 273, 403/300, 24; 285/330, 381, 909

[56] References Cited

U.S. PATENT DOCUMENTS

| | | |
|---|---|---|
| 2,027,962 | 1/1936 | Currie . |
| 2,863,972 | 12/1958 | Barton . |
| 3,044,657 | 7/1962 | Horton ............................ 285/330 X |
| 3,139,468 | 6/1964 | Wheat ............................ 285/909 X |
| 3,161,850 | 12/1964 | Klug . |
| 3,186,048 | 6/1965 | Tann ................................ 403/300 X |
| 3,724,067 | 4/1973 | Tygard et al. . |

FOREIGN PATENT DOCUMENTS 2527838 1/1977 Fed. Rep. of Germany ...... 285/381
1005684 12/1951 France .

Primary Examiner—Andrew V. Kundrat
Attorney, Agent, or Firm—Lee & Smith

[57] ABSTRACT

In order to connect the case parts (10, 12) of several potentiometer planes, a heat-shrinkable sheath (36) is used. On the outer faces (18, 20) recesses are provided along the contact faces (14, 16), between which recesses a connecting bead (30) is formed. The bead has a knurled edge (34). A heat-shrinkable sheath (36) is tightly applied, after heating and shrinking, to the bead (30), thus connecting the case parts (10, 12) in an axial and angular manner.

5 Claims, 1 Drawing Sheet

DEVICE FOR CONNECTING THE PARTS OF POTENTIOMETER HOUSINGS

TECHNICAL FIELD

The invention relates to a device for connecting housing parts of potentiometers composed along a contact surface wherein, (a) the housing parts have identical external profiles,
(b) are designed as rotational elements and
(c) are connected by means of a tensioned tape placed therearound.

BACKGROUND ART

For attaching a lid portion of a potentiometer or for connecting several potentiometers, it is known to provide rims at the elements which have to be connected along the contact surfaces such that a bead is formed after assembling. A strap retainer having a u-shaped cross section is placed around this bead and is tightened by a kind of clip.

In a potentiometer with several potentiometer decks it is necessary to align the potentiometer resistors with sliders arranged on a common potentiometer shaft, such that, with a determined position of the potentiometer shaft, the output zero, e.g., results simultaneously from all potentiometers. The potentiometer resistors are located in shallow, annular housing parts which are placed one on top of the other and are rotated relative to each other for adjustment. The potentiometer shaft with all sliders extends through all the housing parts. Then the housing parts are tightened by the strap retainers in their adjusted positions.

With this kind of connection the radially projecting clips are inconvenient. Also tightening of the strap retainers is labor-intensive. It has to be made with great care, in order to avoid malajustment during the tightening process. Besides the strap retainers with clips are relatively expensive.

"Heat-shrinkable sheaths" are known. They consist of a material which permanently shrinks very much when they are heated. Such heat-shrinkable sheahs are for example used to protect soldering joints: A piece of heat-shrinkable sheath is pushed over a soldering joint and is heated. It shrinks and thus adapts to the shape of the enclosed elements. In this way the soldering joint is covered waterproof and relieved from tension. Materials of this kind are described in U.S. Pat. No. 2,027,962 and U.S. Pat. No. 3,086,242.

It is also known to connect elements by means of a material which permanently shrinks very much when it is heated.

From DE-A-No. 2 527 838 a tube connection, particularly for pressurized air conduits, or suction conduits is known which is established by a heat-shrinkable sheath extending around the adjacent tube ends. DE-B-No. 1 024 838 shows a tube connection for drain tubes in which a bushing bridging the tube ends consists of a plastic material which, after application to the tube end to be enclosed, shrinks upon the supply of heat.

In the known tube connections the heat-shrinkable sheath section is supported by the external surface of the tube ends. In some embodiments a flange projecting outwardly or a bead is provided on each tube end the heat-shrikable sheath extends around the flanges or beads. The connection is either frictional in axial direction or has flanges or the like projecting outwardly beyod the tube surface. Besides the angular position of the tube ends relative to the tube axis is non-critical in tube connections unlike in housing parts of potentiometers.

From U.S. Pat. No. 3,513,429 heat responding actuators are known which have a longitudinally tensioned element which is shrinkable by heat and which receives two contact elements. Under the influence of heat this shrinkable element changes its length and thereby causes the contact elements to be moved towards each other. The heat-shrinkable element can also be rotated in circumferential direction such that it causes relative rotational movement of the contact elements under the influence of heat.

DISCLOSURE OF THE INVENTION

It is the object of the invention to construct a device of the kind mentioned in the beginning by simple means, such that no radially projecting clips or the like are present.

According to the invention this object is achieved in that (d) the parts which have to be connected to each other have one annular groove each in their external surfaces along the contact surfaces and spaced from these contact surfaces, such that a bead is formed between the two grooves,
(e) the surface of the bead has a reduced diameter compared to the external surfaces of the housing parts which have to be connected, and
(f) the tensioned tape is formed by a heat-shrinkable sheath which, in shrunk condition, engages the grooves and extends around the bead.

Thus the grooves define a bead therebetween, which is inwardly set back relative to the housing parts. A heat-shrinkable sheath engages the grooves and extends around the two part bead. Thus the housinge parts are held positively in axial direction. There are no portions which project beyond the surface of the housing parts.

Preferably the surface of the bead is knured to ensure a definite angular position also with strong torsional strain.

Correct centering of the housing parts to each other is achieved in that the contact surfaces are stepped complementaryly.

BRIEF DESCRIPTION OF THE DRAWINGS

An embodiment of the invention is described hereinbelow in further detail with reference to the accompanying drawings.

PREFERRED EMBODIMENT OF THE INVENTION

Figure 1:
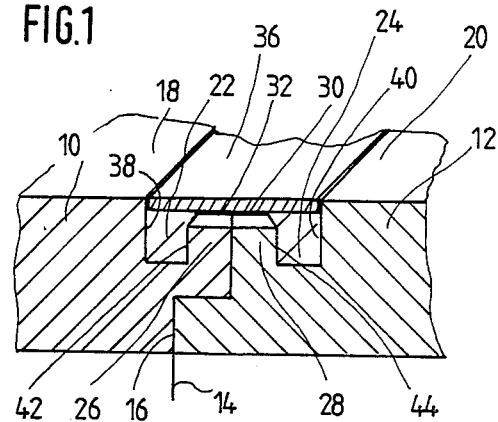
FIG. 1 is a perspective, sectional partial view of a device for connecting rotational elements as potentiometer decks by means of a heat-shrinkable sheath, before the shrinking process.
Figure 2:
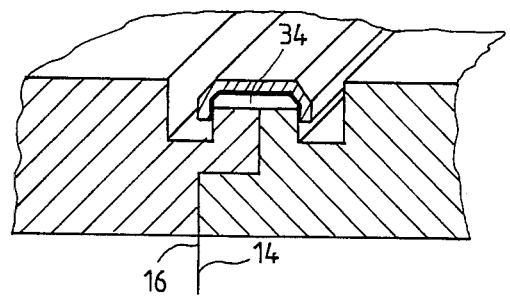
FIG. 2 is a partial view corresponding to FIG. 1 after the shrinking process.

Two potentiometer decks with shallow, annular housing parts 10 and 12 shall be connected to each other. It can be imagined that the two housing parts 10 and 12 in FIG. 1 and FIG. 2 are cylindric and cut in the middle, FIG. 1 and FIG. 2 showing only a section on one side and in the area of the contact surfaces 14, 16. The two housing parts 10 and 12 are rotational bodies and are arranged to be rotated relative to each other about their axis (not illustrated). The contact surfaces 14 and 16 are complementaryly stepped, such that the housing parts 10 and 12 are centered relative to each other. The external surfaces 18 and 20 of the two housing parts 10 and 12, respectively, are cylindric and have the same diameter. As has already been mentioned hereinbefore with reference to the prior art, potentiometer windings are located in the two housing parts 10 and 12 coaxially to the axis of the housing parts and now, for the purpose of adjustment are rotatable with the housing parts relative to the potentiometer shaft with the sliders.

The housing parts 10 and 12 have one annular groove each 22 and 24, respectively, in their external surface 18 and 20, respectively, along the contact surfaces 14 and 16, respectively, and spaced from these contact surfaces. A bead 30 is formed between the two grooves 22 and 24 by the two projecting rims 26 and 28. The external surface 32 of the bead 30 has a reduced diameter compared to the external surfaces 18, 20. The external surface 32 of the bead 30 has a knurl 34. The knurl 34 is formed by axial notches equally distributed throughout the external surface 32.

The connection of the two housing parts 10 and 12 is made by a heat-shrinkable sheath 36 which is illustrated in FIG. 1 in the non-shrunk condition. The distance of the external sidefaces 38 and 40 of one and the other recess 22 and 24, respectively, which project radially to the bead 30 and face each other, is equal to the width of the non-shrunk heat-shrinkable sheath 36.

The described housing parts 10 and 12 are adjusted relative to each other as described hereinbefore. Then a heat-shrinkable sheath 36 is pushed over the housing parts 10 and 12. The inner diameter of the heat-shrinkable sheath 36 is selected a little smaller than the diameter of the external surfaces 18 and 20. Therefore the heat-shrinkable sheath 36 is for example elastically streched during the pushing over and then snaps in between the sidefaces 38 and 40. Then the heat-shrinkable sheath is located on the bead 30 and is held at its rims between the sidefaces 38 and 40. Thus the heat-shrinkable sheath 36 is radially and laterally held and guided such that the shrinking process cannot proceed in an indefinite manner. Subsequently the heat-shrinkable sheath 36 is heated by a circular array of hot air nozzles and thus the shrinking process is initiated. Thus the heat-shrinkable sheath 36 contacts the bead 30 closely in the manner illustrated in FIG. 2. The heat shrinkable sheath 36 engages the grooves 22 and 24 and contacts the sidefaces 42 and 44 of the bead 30 closely. Thereby the housing parts 10 and 12 are held together in axial direction. But the heat-shrinkable sheath 36 adapts also closely to the shape of the knurl 34. The material of the heat-shrinkable sheath 36 contracts into the notches of the knurl 34. In this way the circumferential direction is also secured, that means secured against rotation of the housing parts 10 and 12 relative to each other. This securing against rotation is positive and not only frictional as in the known device with strap retainers. Projecting portions are avoided.

I claim:

1. A potentiometer housing comprising at least two rotational housing parts of identical outer diameters, said parts having a peripheral surface and end faces and being composed along contacting end faces, at least one of said housing parts containing a potentiometer resistor, which is accurately, angularly adjusted relative to the other housing part to provide a desired output from the potentiometer, each housing part having an annular groove in its peripheral surface spaced from said contacting end faces such that a bead is formed by the ends of the contacting end faces between said annular grooves, said beads having reduced diameter relative to the peripheral surfaces of the housing parts, the surface of the beads being knurled, whereby a cavity is defined between the knurled surface of the bead and opposite side walls of the grooves projecting beyond said bead, a heat-shrinkable sheath, of which, in its non-shrunk state, the width is substantially equal to the spacing between said opposite projecting side walls and the internal diameter is slightly smaller than the outer diameter of the peripheral surfaces of the parts, beingn snapped into said cavity and shrunk to engage the grooves and to extend around the bead, tightly engaging the knurled surface to counteract relative angular displacement of the parts.

2. Device as set forth in claim 1, characterized in that the knurl (34) is formed by axial notches equally distributed throughout the external surface (32).

3. Device as set forth in claim 1, characterized in that the distance of the external sidefaces (38, 40) of one and the other recess (22 and 24, respectively) projecting radially to the bead (30) and facing each other, is equal to the width of the non-shrunk heat-shrinkable sheath (36).

4. Device as set forth in claim 1, characterized in that the contact surfaces (14, 16) are stepped complementarily.

5. A method of connecting housing parts of substantially identical external profiles to form a potentiometer housing, said housing parts having peripheral surfaces and end faces, the end faces of adjacent housing parts contacting each other, and at least one of said housing parts containing a potentiometer resistor, which is to be accurately, angularly adjusted relative to an adjacent housing part, comprising the steps of (a) providing a circumferential groove in said peripheral surface of each of said housing parts, the grooves of adjacent housing parts being spaced from the contacting end faces to form a bead therebetween, and providing a reduced diameter of the housing parts between said grooves and said end faces, whereby an annular cavity is defined around a peripheral surface of said bead and between opposite side walls of said grooves, (b) knurling said housing parts between said grooves and said end faces, (c) adjusting the relative angular positions of said housing parts, (d) pushing over said parts a heat-shrinkable sheath, of which the width is equal to the distance of said opposite side faces and of which the inner diameter, in its non-shrunk state, is a little smaller than the outer diameter of the peripheral surface of the parts, whereby the heat shrinkable sheath is slightly elastically stretched, when being pushed over the parts and resiliently snaps into said annular cavity, wherein it is axially held between said opposite side walls, and (e) heating said heat-shrinkable sheath, whereby said sheath shrinks on said bead and engages said knurled surface thereof to hold the two parts in their adjusted relative angular positions both axially and circumferentially.

* * * * *